United States Patent [19]
Tang et al.

[11] Patent Number: 5,833,814
[45] Date of Patent: Nov. 10, 1998

[54] APPARATUS AND METHOD FOR PURIFYING BORON TRICHLORIDE BY REMOVAL OF PHOSGENE

[75] Inventors: Edward Deming Tang, Edison, N.J.; Walter H. Whitlock, Chapel Hill, N.C.; Edward Frederick Ezell, Warren, N.J.

[73] Assignee: The BOC Group, Inc., New Providence, N.J.

[21] Appl. No.: 883,930

[22] Filed: Jun. 27, 1997

[51] Int. Cl.$^6$ .................................. C01B 1/00; C01B 7/00
[52] U.S. Cl. .................................... 204/158.2; 204/157.48
[58] Field of Search ............................ 204/158.2, 157.48

[56] References Cited

U.S. PATENT DOCUMENTS 4,405,423   9/1983   Freund .............................. 204/157.1 R

*Primary Examiner*—Kathryn L. Gorgos
*Assistant Examiner*—Edna Wang
*Attorney, Agent, or Firm*—David M. Rosenblum; Salvatore P. Pace

[57] ABSTRACT

An apparatus and method for purifying boron trichloride by removal of phosgene. In accordance with the invention, phosgene is photolytically decomposed into carbon monoxide and chlorine and liquid vapor phase in equilibrium with one another and in solution with the boron trichloride. This equilibrium is disturbed preferably by sparging a vapor stream that rises through the boron trichloride and is composed of the substance, such as nitrogen, to disturb the equilibrium and thereby cause the carbon monoxide and chlorine to be carried out of solution and collect in the overhead space. The decomposition product of chlorine and carbon monoxide can then be removed from the vapor space so that the carbon monoxide and chlorine does not recombine and contaminate the boron trichloride with phosgene.

3 Claims, 1 Drawing Sheet

APPARATUS AND METHOD FOR PURIFYING BORON TRICHLORIDE BY REMOVAL OF PHOSGENE

BACKGROUND OF THE INVENTION

The present invention relates to an apparatus and method for purifying boron trichloride by removal of phosgene in which the phosgene is decomposed by exposure to electromagnetic radiation of ultra-violet wavelength. More particularly, the present invention relates to such an apparatus and method in which the equilibrium of the decomposition components of the phosgene within the boron trichloride is disturbed to remove the decomposition components from the solution.

Boron trichloride ($BCl_3$) has varied uses in many industrial processes. Although the purity of boron trichloride is of importance in most applications, it is particularly important in the field of micro-electronics. The use of boron trichloride in the electronics industry generally requires impurity levels of phosgene ($COCl_2$) in an amount ranging from between about 10 and about 0.5 parts per million. It is difficult to remove phosgene from boron trichloride through distillation or other common separation techniques due to the similarity of the volatilities of boron trichloride and phosgene and also due to the similarity of the molecular structures.

As a result, alternative methods of phosgene removal have been proposed that involve the exposure of the boron trichloride to electromagnetic radiation. For instance, in U.S. Pat. No. 4,063,896, boron trichloride is exposed to $CO_2$ laser radiation passed through a laser cell. The radiation causes the phosgene to disassociate into dissociation products such as carbon monoxide and chlorine. In U.S. Pat. No. 4,405,423, boron trichloride is dissolved in a cryogenic solution and exposed to an ultra-violet light emitted from a mercury arc lamp to reduce the phosgene impurity.

The problem with such methods (described in the above-referenced patents) is that if the dissociation products of phosgene are not removed from solution with boron trichloride, they will recombine to re-produce the phosgene impurity. As the dissociation products of phosgene build-up over time, the recombination rate increases and eventually the recombination rate equals the dissociation rate and a state of equilibrium is reached between the phosgene and its dissociation products. Once equilibrium is reached, there is no further reduction in the phosgene concentration. Thus, these methods are not effective to reduce impurity levels below a certain point and thus, cannot be used to reduce impurity levels of phosgene to that required for the electronics industry.

As will be discussed, the present invention provides an inexpensive method of treating the solution of boron trichloride and decomposition products of phosgene to effect removal of the dissociation products and thus allow production of boron trichloride at a very low level of phosgene impurity.

SUMMARY OF THE INVENTION

The present invention provides an apparatus for purifing boron trichloride by removal of phosgene. In accordance with the invention, a reactor is provided having an overhead space and an inlet to receive the boron trichloride beneath the overhead space. An outlet is provided to discharge an overhead stream comprising carbon monoxide and chlorine. At least one source of electromagnetic radiation having a wavelength in a range of between about 230 and about 270 nanometers is provided to decompose the phosgene, thereby to produce the carbon monoxide and chlorine as vapor and liquid phases in equilibrium with one another and in solution with the boron trichloride. A means is provided for producing a vapor stream rising through the boron trichloride and composed of a substance to disturb the equilibrium and thereby to cause the carbon monoxide and chlorine to be carried out of solution and to collect in the overhead space.

In another aspect, a method is provided for purifying boron trichloride by removal of phosgene. In accordance with this method, a liquid comprising the boron trichloride and phosgene is exposed to electromagnetic radiation having a wavelength in a range of between about 230 and about 270 nanometers to decompose the phosgene, thereby to produce carbon monoxide and chlorine. Carbon monoxide and chlorine are produced in solution with boron trichloride and in equilibrium with one another and phosgene. The equilibrium is disturbed to thereby cause the carbon monoxide and chlorine to be carried out of solution above the boron trichloride. The carbon monoxide and chlorine can then be removed.

As will be discussed, the apparatus and method of the present invention can be effectuated by sparging nitrogen or other inert gas into a vessel containing the radiated boron trichloride. Alternatively, in place of sparging, a reboiler situated in the bottom of the vessel will cause vaporization of the boron trichloride and the resulting boil-up can serve as the vapor to disturb the equilibrium. The resulting overhead vapor can then be removed and disposed of. It is equally possible to supply boil-up of boron trichloride by applying a vacuum to the head space of the container. This will also cause the chlorine and carbon monoxide to collect in a vapor space region of the container for eventual removal. Boil-up, either from a reboiler or vacuum, can either be used alone or in combination with sparging. The removal of the decomposition products prevents phosgene from reforming within the boron trichloride.

BRIEF DESCRIPTION OF THE DRAWINGS

While the specification concludes with claims distinctly pointing out the subject matter that Applicants' regard as their invention, it is believed the invention will be better understood when taken in connection with the accompanying drawing in which the sole FIGURE is a schematic view of an apparatus for carrying out the present invention.

DETAILED DESCRIPTION

Figure 1:
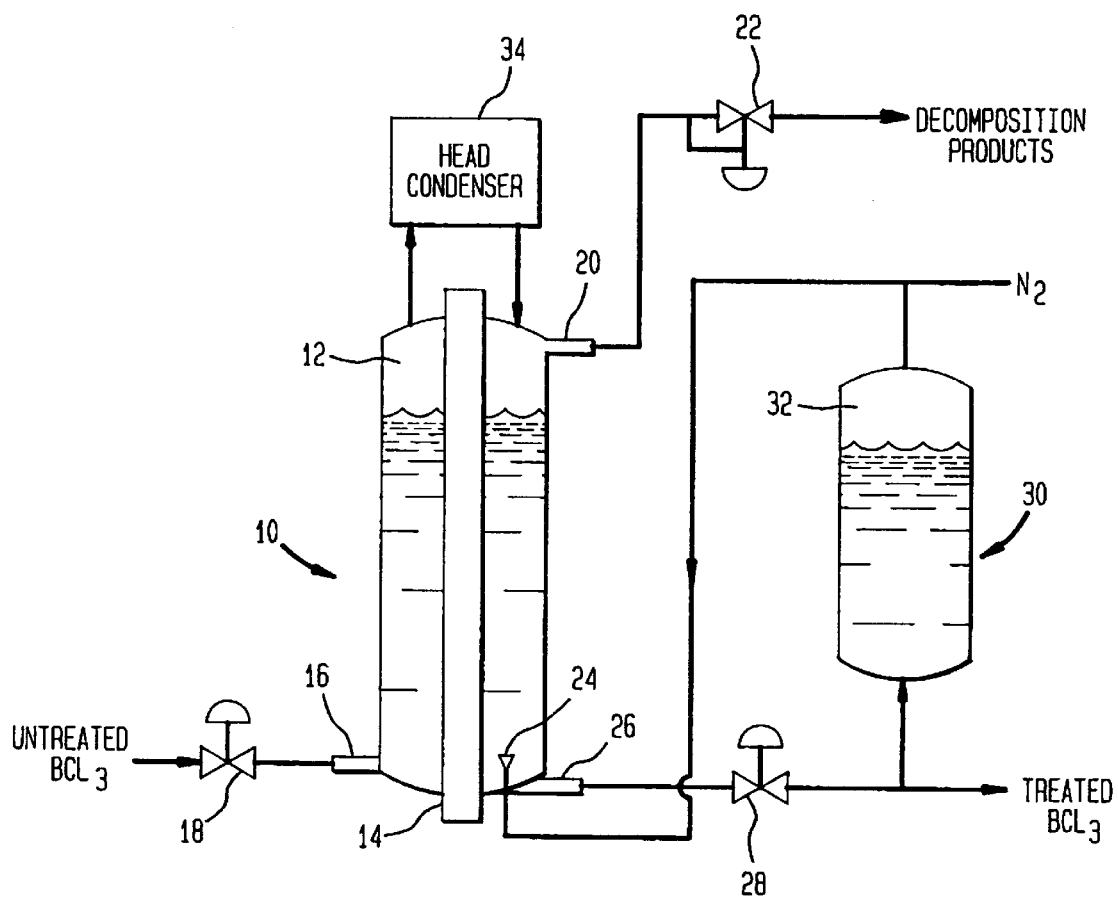

With reference to the FIGURE, a stream of crude liquid boron trichloride is introduced into a reactor in the form of a vessel 10 having a head space 12 in which the decomposition products collect. Projecting through vessel 10 is a mercury vapor lamp 14. Preferably, the lamp radiates ultraviolet light at a wavelength in a range of between about 230 and 270 nanometers. Light having a wavelength below 230 nanometers can decompose the boron trichloride. At the other end of the range, light having a wavelength of above about 270 nanometers will not be effective to cause phosgene decomposition. A wavelength of about 254 nanometers has been found to be particularly preferred.

The light intensity of mercury vapor lamp 14 must be selected so as not to be so attenuated in the liquid that liquid at the walls of vessel 10 is not stimulated. Preferably, the light intensity is selected so that the light is about 75% of its original radiated intensity when measured at the outer radius of the vessel.

Vessel 10 is also provided with an inlet 16 and valve 18 to permit the flow of boron trichloride into vessel 10. As has been discussed, decomposition products of chlorine and carbon monoxide are removed as overhead from head space region 12 through an outlet 20. The pressure within vessel 10 is regulated by a back pressure valve 22. In order to carry out the decomposition products from the boron trichloride contained within vessel 10, a vapor stream is produced by introducing nitrogen into a bottom region of vessel 10 through a sparging nozzle 24.

Preferably, the crude liquid boron trichloride enters at a pressure of about 60 psig, the nitrogen enters at a pressure of about 100 psig and the back pressure valve 22 is set at about 30 psig. By way of example, the boron trichloride contains about 148 part per million of phosgene as an impurity. In the illustrated embodiment approximately 11 liters of boron trichloride are treated by sparging nitrogen having an impurity level of preferably less than 1 ppm water and less than 1 ppm oxygen and a flow rate of about 1.5 SLM. After a suitable time has elapsed for the decomposition of the phosgene and the carrying away of the decomposition products, liquid boron trichloride is removed from a bottom outlet 26 for further purification. In the illustrated embodiment, the time was about 40 min and resulted in the boron trichloride having an impurity level of about 10 parts per million.

As illustrated, boron trichloride is discharged from vessel 10 through an outlet 26 controlled by a valve 28. Boron trichloride can be collected within a vessel 30 which is in itself pressurized with nitrogen in its head space 32.

In conducting a method in accordance with the invention, the final phosgene concentration is dependent on the starting phosgene concentration, the light intensity, the starting concentrations of carbon monoxide and chlorine, and the rate of sparging or boil up, and the time allowed for decomposition. It is preferable, but not necessary, in conducting the method to have the concentrations of carbon monoxide and chlorine, low relative to the concentration of phosgene. The time development of the phosgene concentration can be described by a differential equation in which the time rate of change of the phosgene concentration at any given time is set forth as a function of the quantum yield, the rate constant for dissociation of phosgene, the UV light intensity, the phosgene concentration, the concentrations of carbon monoxide and chlorine which remain in the solution which can react to form phosgene, and the rate of sparging or boil-up. It has been found that the vapor stream or boil-up is best introduced at a rate sufficient to carry away the decomposition products carbon monoxide and chlorine approximately as quickly as they are made. There is very little benefit to higher flow rates for the vapor stream. At slower flow rates for the vapor stream, the process will work but the process will take an inordinate amount of time.

This process can also be described in terms of displacement to the state of equilibrium which would be achieved under the UV irradiation among the phosgene, chlorine and carbon monoxide concentrations in the absence of the sparging or boil-up which the method provides. This equilibrium condition can be described in terms of a relation among the phosgene, chlorine, and carbon monoxide concentrations. The vapor, produced either by boil-up or as illustrated, by sparging, effects equilibrium as follows. The molar fraction of either carbon monoxide or chlorine in the liquid is much lower than the molar fraction in the vapor phase. As a result, as a vapor such as nitrogen, is sparged through the liquid, the chlorine and carbon monoxide in the gas phase will readily mix with the nitrogen gas to be carried out of solution. Since the concentrations of carbon monoxide and chlorine in the solution (liquid) phase has been depleted, more phosgene in the liquid phase is converted into carbon monoxide and chlorine for removal by the nitrogen. It is to be noted, that while in solution, it is not known by the inventors herein as to whether the chlorine exists in ionic and/or molecular forms. Furthermore, any chlorine existing in the boron trichloride in ionic or molecular form prior to the decomposition of phosgene will also be removed in conducting the process of the present invention.

In order to make sure that gas or vapor is sparged through at a sufficient flow rate, the output concentrations of carbon monoxide and chlorine can be measured. Additional component concentrations within the overhead are phosgene and boron trichloride. The process should be conducted to see the phosgene, carbon monoxide, and chlorine component concentrations keep decreasing in the vapor phase. The effectiveness of the sparging process can be judged by the manner in which the concentrations of carbon monoxide, chlorine, and phosgene decrease in the vapor phase as the total amount of boron trichloride which has been removed by sparging increases. Practically at too high a vapor flow rate, boron trichloride will be taken out of solution without altering significantly the rate at which the phosgene concentration is decreased. At all vapor flow rates boron trichloride will be taken out of solution. Since product appears in the vapor removed from vessel 10, a head condenser 34 can be provided communicating with head space 12 to condense the boron trichloride and return the same to head space 12 of vessel 10. Carbon dioxide can be used as a coolant for head condenser 34.

While the present invention has been described with reference to preferred embodiment, it will occur to those skilled in the art numerous changes and additions can be made without departing from the spirit and scope of the present invention.

We claim:

1. A method of purifing boron trichloride by removal of phosgene, said method comprising:

exposing a liquid comprising said boron trichloride and phosgene to electromagnetic radiation having a wavelength in a range of between about 230 and about 270 nanometers to decompose said phosgene and to produce carbon monoxide and chlorine as vapor and liquid phases in equilibrium with one another and in solution with said boron trichloride;

introducing a vapor stream into said liquid so that vapor rises through said liquid, the vapor being composed of a substance to disturb said equilibrium and cause said carbon monoxide and chlorine to be carried out of the solution above said liquid; and removing said carbon monoxide and chlorine.

2. The method of claim 1, wherein said vapor stream comprises nitrogen sparged into said liquid.

3. The method of claim 1, further comprising condensing boron trichloride vapor evolved from said liquid to form a condensate and returning said condensate back to said liquid.

* * * * *